J. W. PARRISH.
GREASE CUP PLUG.
APPLICATION FILED NOV. 13, 1912.

1,076,388.

Patented Oct. 21, 1913.

Witnesses
Raymond L. Gilbert
P. M. Smith

Inventor
J. W. Parrish
By Victor J. Evans
Attorney

COLUMBIA PLANOGRAPH CO., WASHINGTON, D. C.

UNITED STATES PATENT OFFICE.

JOSEPH W. PARRISH, OF NASHVILLE, TENNESSEE.

GREASE-CUP PLUG.

1,076,388.  Specification of Letters Patent.  Patented Oct. 21, 1913.

Application filed November 13, 1912. Serial No. 731,160.

*To all whom it may concern:*

Be it known that I, JOSEPH W. PARRISH, a citizen of the United States, residing at Nashville, in the county of Davidson and State of Tennessee, have invented new and useful Improvements in Grease-Cup Plugs, of which the following is a specification.

This invention relates to grease cup plugs, the object in view being to provide a device of the class described which may be readily locked and unlocked so as to avoid all chance of the same becoming lost by displacement due to vibration of the machinery or other conditions.

The invention is designed for use in connection with the ordinary or conventional form of grease cup for containing grease or other lubricant to be forced or caused to pass out of the cup or receptacle upon the journal or shaft to be lubricated, the forcing of the lubricant from the chamber or cup being ordinarily effected by screwing the plug farther into the cup.

The device of this invention operates in the ordinary manner but in addition thereto means are provided for securely locking the plug against accidental dislodgment and escape; at the same time the plug may be readily removed or released at the will of the operator whenever required.

With the above and other objects in view, the invention consists in the construction, combination and arrangement of parts, as will be hereinafter more fully described, illustrated in the accompanying drawing and pointed out in the claims hereunto appended.

Figure 1:
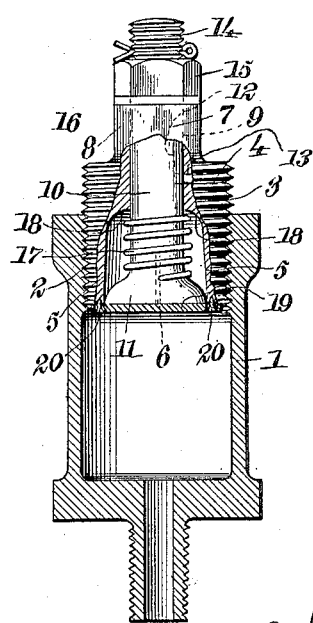
Figure 2:
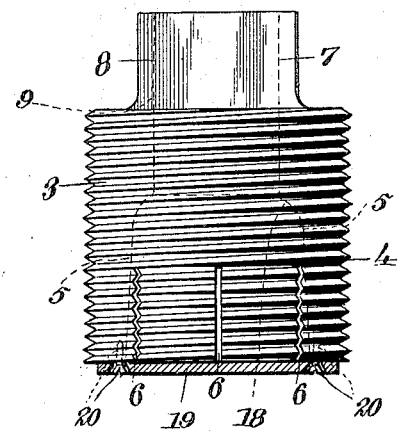
Figure 5:
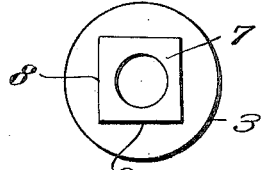
Figure 3:
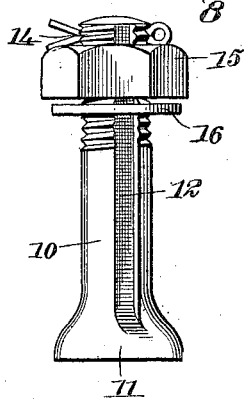
Figure 4:
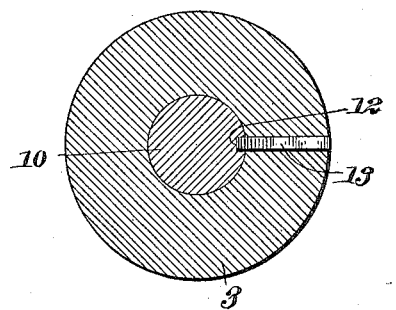

In the accompanying drawing:—Figure 1 is a diametrical section through a grease cup, showing the improved plug employed in connection therewith. Fig. 2 is a side elevation of the plug. Fig. 3 is a side elevation of the expander. Fig. 4 is a cross section, taken in line with the key. Fig. 5 is a top plan view of the plug.

Referring to the drawing, 1 designates a grease cup of the usual form, the same being internally threaded, as shown at 2. The plug 3 is exteriorly threaded, as shown at 4, to fit the internal threads in the cup and admit of the screwing of the plug into the cup for the purpose of expelling the grease or other lubricant therefrom. The plug is substantially cylindrical in shape and in carrying out the present invention, said plug is provided with a taper bore the wall of which is indicated at 5 and the purpose of which will hereinafter appear. The cylindrical wall of the plug is also provided at any desired number of intervals with slits 6 extending from the bottom edge thereof upward any suitable distance thereby enabling the lower marginal portion of the plug to be expanded by the means hereinafter described. At its upper or outer end, the plug is provided with a head lug 7 formed with flat sides, as shown at 8, to admit of the same being turned by means of a wrench. A hole 9 extends through the head lug 7 and communicates with the taper bore 5, adapting the same to receive the expander which comprises a shank 10 having at its inner end an enlarged shoulder or head 11 which is adapted to ride in contact with the wall of the taper bore 5 as the shank 10 is drawn outward through the hole 9. The shank 10 is provided with a longitudinal keyway 12 in which fits the inner end of a key 13 inserted through an opening in the side of the plug and fastened permanently therein in any convenient manner. This key prevents the shank 10 from turning while allowing the said shank to slide lengthwise through the hole 9. The outer end of the shank is threaded as shown at 14 to receive a nut 15 which works in contact with a washer 16 resting on top of the head lug 7, so that by turning the nut 15 the shank 10 and head 11 are drawn toward the outer end of the plug, causing the shoulder or head 11 to coöperate with the upwardly contracting wall of the taper bore 5 to the end that the split portion of the body of the plug is expanded thereby causing the threads 4 to bind tightly but frictionally against the internal threads of the cup thereby locking the plug against displacement.

A coiled expansion spring 17 encircles the shank 10 between the head 11 and a shoulder 18 at the junction of the taper bore 5 and the shank hole 9, said spring serving, when the nut 15 is loosened, to move the head 11 toward the lower end of the plug, thereby allowing the expanded wall of the plug to contract. This releases the plug so that it may be turned in or out.

A disk-shaped plate 19 covers the inner end of the bore 5 so as to prevent the grease from entering said bore and pressing against the head 11 so as to cause said head to bind, preventing the loosening of the head, when desired. This plate 19 is fastened to the plug 3 by means of pins or screws 20, passing through holes in the plate 19, one or more of said holes being enlarged or elongated, as shown, to admit of the expansion and contraction of the plug.

By means of the construction above described, the plug may be loosened at any time and screwed farther into the cup for the purpose of expelling the grease or other lubricant therefrom, and after the desired adjustment has been obtained, the plug may be locked by tightening the nut 15.

I claim:—

1. A grease cup plug externally threaded to screw into a grease cup and provided with an internal taper bore, a longitudinally split cylindrical wall, a head lug on said plug having flat side walls and a central hole extending into said taper bore, an expander embodying a shank slidable through said hole and keyed to the plug to prevent relative turning of said parts, a head on said shank housed within the plug and working in contact with the wall of the taper bore, a nut threaded on the shank and bearing against said lug, and a closure for the bottom of the plug.

2. A grease cup plug externally threaded to screw into a grease cup and provided with an internal taper bore, a longitudinally split cylindrical wall, a head lug on said plug having flat side walls and a central hole extending into said taper bore, an expander embodying a shank slidable through said hole and keyed to the plug to prevent relative turning of said parts, a head on said shank working in contact with the wall of the taper bore, a nut threaded on the shank and bearing against said lug, and an expansion spring encircling said shank and operating in opposition to said nut.

3. A grease cup plug externally threaded to screw into a grease cup and provided with an internal taper bore, a longitudinally split cylindrical wall, a head lug on said plug having flat side walls and a central hole extending into said taper bore, an expander embodying a shank slidable through said hole and keyed to the plug to prevent relative turning of said parts, a head on said shank working in contact with the wall of the taper bore, a nut threaded on the shank and bearing against said lug, and a plate covering the bottom of the plug bore and secured to the plug in such manner as to admit of the expansion of the plug.

In testimony whereof I affix my signature in presence of two witnesses.

JOSEPH W. PARRISH.

Witnesses:
CARRIE NICKEL,
WM. H. PARRISH, Sr.